Dec. 5, 1967 K. M. KISER ET AL 3,356,529

METHOD FOR THE DEPOSITION OF AN ELECTROCONDUCTIVE TRANSPARENT INDIUM OXIDE COATING

Filed July 31, 1964

Inventors:
Kenneth M. Kiser;
Ray W. Shade,
by Leo I. MaLossi
Their Attorney.

United States Patent Office 3,356,529 Patented Dec. 5, 1967

3,356,529

METHOD FOR THE DEPOSITION OF AN ELECTRO-CONDUCTIVE TRANSPARENT INDIUM OXIDE COATING

Kenneth M. Kiser, Scotia, and Ray W. Shade, Burnt Hills, N.Y., assignors to General Electric Company, a corporation of New York Filed July 31, 1964, Ser. No. 386,494
11 Claims. (Cl. 117—201)

This invention relates to a process for the preparation of thin optically transparent electrically conductive coatings on substrates and more particularly to the preparation of thin coatings of indium oxide having pre-selected resistivity and transparency characteristics.

This invention is generally applicable to the preparation of thin transparent electrically conductive indium oxide coatings on articles of various description. Thus, the process of this invention may be used to prepare resistance heating panels, either transparent (e.g., windows) or opaque (e.g., walls); to prepare outer electrodes for electroluminescent panels; to supply non-metallic coatings allowing full view of a decorative motif underlay, or to prepare thin film resistors.

However, the high performance and unique capacities of this invention are best illustrated in connection with the manufacture and use of thermoplastic recording tape (TPR), which tape embodies a thin, flexible electrically conducting layer. Particular aspects of this process enabling its wide application are the availability of reliable parameter controls for determining the resistance values of the coating and the use of lower temperature exposures for the substrate.

Thermoplastic recording (TPR) devices have been designed wherein a tape is employed which consists of an optical grade plastic substrate one side of which is coated with a thin film of an electrical conductor. The electrical conductor is itself then covered by a thermoplastic material whereon the intelligence is registered in the form of surface irregularities. A more complete description of various TPR tape constructions may be found in copending application Ser. No. 161,003—Herrick, filed Dec. 21, 1961, and now Patent No. 3,201,275, and assigned to the assignee of this invention.

The purpose of the conducting film in thermoplastic recording processes is to serve as an electrical ground plane. Since the intelligence recorded in the thermoplastic layer is retrieved therefrom by the use of an optical read-out method employing the transmission of light through the tape, it is required that the conducting film be both optically transparent and electrically conducting. It may be readily seen that in order to increase the efficiency of the optical system to its maximum effectiveness for read-out, the electrically conducting layer must be as transparent as possible. This transparency to light includes not only low light adsorption in the visible range of the spectrum but also in the infrared portion of the spectrum in order to minimize any heating effect in the tape during use (optical read-out). Minimizing the heating of the TPR tape is particularly important because if the temperature of the TPR tape rises much above about 70° C., the intelligence stored in the deformations in the thermoplastic layer will be lost and, if the temperature of the tape should rise above about 100° C., it may be damaged by distortion.

It is precisely because of the very stringent operating conditions necessitated in the manufacture of TPR tape, that this construction has been selected for the illustration of this invention. However, where the term "substrate" is used in the specification and the claims without modifying language, it is to be understood that the term refers to a base, whether rigid or flexible, upon which an indium oxide layer is to be supported and may be of any of a variety of materials such as plastic, glass, non-metals, and in the case of applications in which electrical conduction is not a requisite, metals.

Deposition of the indium metal on the substrate material may be accomplished by various methods, as for example by thermal evaporation or by sputtering, so long as the deposition is conducted in the presence of oxygen at the requisite pressure.

Plastic substrates such as are employed in the manufacture of TPR tape are susceptible to distortion at temperatures of over 100° C. One earlier developed process has been presented as enabling the deposition of indium metal and the conversion thereof to indium oxide at temperatures below about 100° C. However, this method, which has been described in U.S. 2,932,590—Barrett et al., is severely limited in its applicability in commercial applications, because of the requirement therein for the use of very low indium deposition rates, i.e., not greater than about 100 angstroms per minute. Quite unexpectedly and contrary to the teachings of U.S. 2,932,590 it has been found that by using deposition rates even several orders of magnitude greater than 100 angstroms per minute a superior product is produced able to meet the rigid demands for the construction of TPR tape.

One condition must, of course, prevail to enable successful use of these high deposition rates, which have been successfully extended to values of over 100,000 angstroms per minute, thus, it is required that the ratio of the oxygen impingement rate upon the substrate to the indium impingement rate upon the substrate be greater than a certain minimum value in order to obtain films of high optical transmittances. In preparing an indium oxide layer having an optical transmittance for visible light of greater than 95%, the oxygen pressure is related to the deposition rate of the indium by the equation, $$Y=1.8\times10^{-3}X$$

wherein Y is the oxygen pressure in microns of mercury, and X is the indium deposition rate in angstrom units per minute.

It follows therefrom that for each indium deposition rate there is a minimum oxygen pressure that is necessary to achieve films that are readily convertible at low temperatures. As will be shown herein the curve plotted for the above equation is a straight line. For such operation as will result in selected lesser degrees of optical transparency, i.e., 75% for visible light, a similar curve having a lesser slope and passing through the origin will result. In principle, according to this relationship the indium deposition rate may be as high or low as desired as long as the oxygen pressure equals or exceeds the minimum value corresponding to that deposition rate for a given optical transparency curve. As a practical matter, deposition rates of less than 1000 angstroms per minute would result in such low production rates as to be commercially unattractive.

Employing an oxygen pressure greater than that corresponding to the curve has no adverse effect on the final deposit. However, if a lower oxygen pressure is employed the optical transmission value is reduced. At very high indium deposition rates a problem arises in that the minimum oxygen pressure must be commensurately high and more indium-oxygen collisions occur in the gas phase. As a consequence, at deposition rates much in excess of 100,000 angstroms per minute an increasing large amount of the evaporated indium is scattered away from the substrate surface so that a decreasing fraction of the evaporated indium is effectively used.

The above-noted critical relationship that a certain minimum oxygen pressure is required during the use of any given indium deposition rate depends upon the newly discovered phenomenon that the oxygen atoms, which are primarily responsible for the conversion of the indium of the deposited indium to the metal oxide form, are apparently condensed on the plastic substrate integrally with the indium atoms during the deposition thereof. Whether or not these oxygen atoms are actually adsorbed interstitially in the metal lattice has not been established, however, electron diffraction patterns of coatings produced by depositing indium with an oxygen pressure at or slightly above the minimum value defined herein have shown that immediately after deposition the indium film is primarily in the non-oxide metallic form even though sufficient oxygen is incorporated by some mechanism in the film for transformation of the indium metal to the oxide. At any given deposition rate as the corresponding oxygen pressure during indium deposition is increased above the minimum a larger fraction of the indium is converted to the oxide form during the coating step. Unless a very heavy deposit of indium metal has been deposited, the film has a relatively high resistance considering the fact that bulk indium metal is a good conductor. The high resistance for these films is due to the fact that the indium metal in these thin layers is present on the substrate in a particulate, or island-like, structure providing little opportunity for conduction between these minute deposits of indium metal.

It follows that because the oxygen required for conversion to the oxide form is trapped or occluded in the film at the time of deposition, the conversion to the oxide form is insensitive to the presence or absence of oxygen in the ambient atmosphere except for the very top surface layer of the indium film. This has been demonstrated by successfully performing the conversion of the indium metal to the oxide form in various environments, i.e., under a high vacuum, in nitrogen, and in air, all of which provide similar results.

Recognition of this phenomenon of oxygen entrapment during deposition is particularly important in that it is no longer necessary to be certain to expose the surface of the indium layer to an environment containing oxygen in order to successfully execute the conversion to the oxide form. Thus, in those instances in which the indium oxide layer is to be placed upon a flexible substrate the newly coated web can be accumulated in a tightly wound roll and the indium can be successfully converted to the oxide form without uncoiling the roll. Likewise, flat coated sheets or members, which are similarly contoured, may be stacked or nested as the case may be and converted in bulk quantities without the necessity of separating individual coated members from each other to be certain of adequate contact with oxygen in the ambient environment. In the case of long continuous webs or tapes, conversion to the oxide form can now be executed in small ovens thereby eliminating the necessity of passing tapes in the heated condition through various drive systems. In the case of TPR tapes, for example, such exposure tends to distort or mar the plastic substrate for the tape together with its deposited conducting film.

As further indication of the accuracy of the proposition that oxygen atoms are actually trapped in the film and constitute the requisite source for conversion of the indium metal to the oxide form, indium metal was deposited at low pressures ($10^{-4}$ mm. Hg) on a plastic substrate without the admission of oxygen to the chamber. Films of indium metals so deposited could not be converted to indium oxide even after heating in excess of 48 hours at 125° C.

Indium metal layers deposited in the presence of oxygen at or slightly above a pressure corresponding to the minimum pressure defined herein undergo conversion to the oxide form in a period of from about 3 to 4 hours at 100° C., a very rapid conversion considering the temperature. This conversion time, at least in the absence of oxygen, appears to be independent of film thickness presumably because the trapped oxygen atoms are intimately related to the indium atoms to which they become chemically bonded. Conversion temperatures of 75° C. have been repeatedly and successfully employed, and undoubtedly even lower temperatures may be employed, but with a decreased rate of conversion.

It is, therefore, an object of this invention to provide a method for effecting a high rate of deposition of indium metal upon a substrate while maintaining the substrate at relatively low temperature to prevent overheating thereof.

It is another object of this invention to provide a method for depositing a thin layer of indium metal over a substrate at commercially feasible rates of deposition.

It is a further object of this invention to provide a method for the conversion of a layer of indium deposited upon a substrate to the indium oxide form to a selected degree out of contact with oxygen.

It is still another object of this invention to provide a method for producing a thin film of indium oxide upon a substrate, which film may possess a degree of transparency approaching 100% for visible light.

It is still a further object of this invention to provide a commercial method for preparing a thin layer of indium oxide having a resistance value as low as about 1000 ohms per square.

It is still an additional object of this invention to provide a method for producing a film of indium oxide having a degree of control to enable selecting the degree of transparency of the film approaching a value of about 100% for visible light and/or to enable selecting a resistance value for the film having a value ranging upwardly from about 1000 ohms per square.

The aforementioned objects as well as other desired results may be achieved in the practice of this invention which, briefly stated, consists of the steps of: depositing a coating of indium on a substrate at a rate in excess of about 1000 angstroms per minute in an environment containing oxygen at a pressure in the range of from about 2 to about 300 microns of Hg and, depending upon the thickness of the coating and/or upon the oxygen pressure employed during deposition, heating the indium film to the transparent, conducting oxide form at temperatures as low as about 75° C. The deposition temperature need not exceed 100° C. and the heating temperature need not exceed 75° C., unless it is desired to effect the conversion in a relatively short period of time in which case a higher temperature will be employed. Depending upon the degree of conversion of the indium to the oxide form any intermediate transparency between 0 and 100% may be obtained.

The exact nature of this invention as well as other objects and advantages thereof will be readily apparent from consideration of the following specification relating to the annexed drawing in which.

Figures 1, 2, 3, 4:
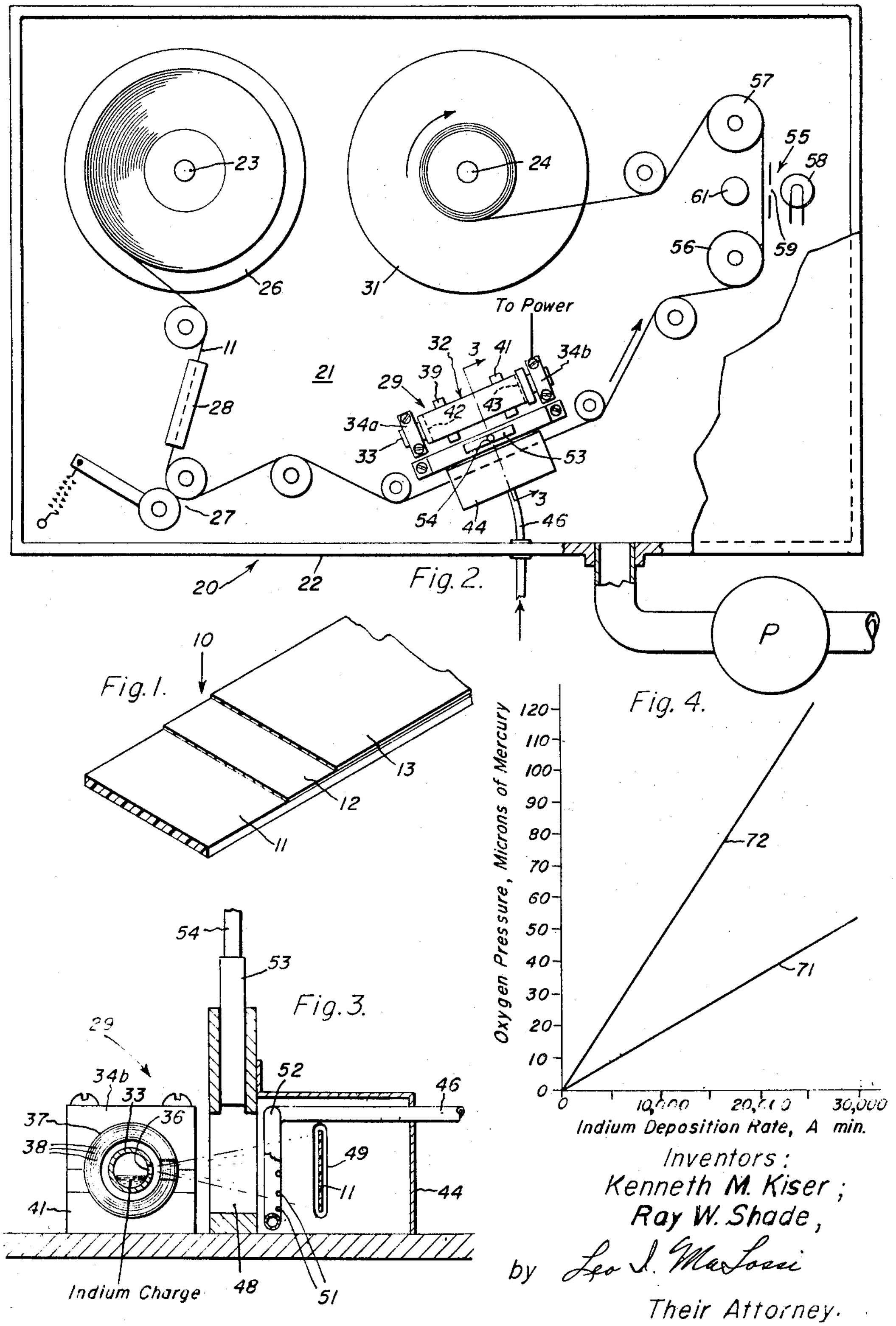
FIG. 1 is a breakway isometric view showing the layer-by-layer construction of thermoplastic recording tape providing an exemplary environment for illustration of this invention.
FIG. 2 is a plan view of a tape transport system employed for applying a thin layer of indium metal to a tape substrate at controllable rates of deposition at selective oxygen pressures.

FIG. 3 is a section taken along line 3—3 through the evaporator assembly and oxygen inlet box of the tape transport system; and FIG. 4 shows one curve defining the approximate minimum oxygen pressure needed to produce (with additional processing) films having maximum transparency as a function of the indium deposition rate; and a second curve showing the minimum oxygen pressure for effecting substantially complete conversion of the deposited indium metal to the oxide form during the indium deposition step without further processing.

Thus, referring to the drawing, FIG. 1 discloses such a tape construction 10 comprising the flexible plastic substrate 11. One side of substrate 11 has been coated with a thin film 12 functioning as an electrical conductor. When layer 12 has been properly prepared the next layer 13 of an appropriate thermoplastic material is applied.

In the preparation of TPR tapes similar to the construction disclosed in FIG. 1, deposition rates in the range from 10,000 to 40,000 angstroms per minute have been commonly employed in the practice of this invention and deposition of indium at these rates may be effected with an apparatus such as is illustrated in FIGS. 2 and 3. The apparatus 20 comprises a vacuum chamber 21 enclosed within box 22. Rotating shafts 23 and 24 for the tape transport system enter through the bottom of box 22 and are equipped with standard O-rings (not shown). Preferably, the top of box 22 is hinged along one edge so that it can be opened to give ready access to the inside of vacuum chamber 21. In order to provide rapid and stepless adjustment of the tape speed, a variable speed, reversible drive powered by three D.C. motors was employed. With this arrangement the speed could be varied by a factor of about four in a given speed range.

As shown, tape 11 unwinds from reel 26, passes through friction coupling 27 (after passage through tunnel heater 28), traverses the coating assembly 29 and thereafter is collected on takeup reel 31. Reel 31 is driven by a separate motor which maintains a small positive drive on the tape 11.

In the coating assembly 29 the main body of the evaporator 32 is machined from graphite and consists of a 4-inch long hollow cylinder 33 disposed between the two supporting end pieces **34*a*, 34*b*. End piece 34*a* is all brass and is electrically grounded and end piece 34*b* has a brass upper portion providing the electrical connection to the cylinder 33. The lower half of end piece 34*b* is of an electrically insulating material such as lava stone. Heating of the evaporator for evaporation of the indium is accomplished by passing a low voltage current through the graphite cylinder 33. Slot 36 (1-inch by 0.0625 inch) in the wall of hollow cylinder 33 is the source of the indium beam. Graphite cylinder 33 is enclosed in a radiation shield 37 comprising several closely-fitted concentric cylinders of iron foil 38. Two alumina cradles 39, 41 mounted on the base of coating assembly 32, hold shield 37 in position. Alumina baffles 42, 43 located at each end of shield 37** reduce the amount of indium escaping in these directions. Unless such baffles are provided the lava stone support quickly becomes coated with indium and a short circuit develops grounding the power supply.

The proper concentration of oxygen about tape 11 during the deposition of the indium thereon is provided by passing the tape through oxygen inlet box 44. A variable-leak control valve (not shown) is used to regulate the flow of oxygen to the box 44 through inlet pipe 46. In addition to providing the requisite oxygen environment at controlled pressure, box 44 is employed to confine the indium to a relatively limited part of the vacuum chamber 21. Tape 11 enters the box 44 through a slit (not shown) and passes by window 48, which allows entry of the indium beam. After exposure to the indium beam the tape 11 exits through a second slit 49 in the opposite end of box 44. Preferably the oxygen enters box 44 through pipe 46 and passes out through small holes 51 in the closed loop 52 extending around window 48 and connected to pipe 46. As the oxygen leaves holes 51 it is directed at the section of tape 11 which is exposed to the indium beam.

When desired, shutter 53 may be moved down by the use of handle 54 projecting through a seal in the top of box 22, thereby preventing entry of the indium beam into box 44 through window 48. In addition to the coating assembly 29, other equipment such as tunnel heater 28 and the resistance and transparency measuring system 54 were employed. Tunnel heater 28 was used to accelerate the degassing rate of the base tape 11 prior to deposition of indium thereon. The resistance and transparency measuring system 55 comprises a pair of resistance pickups 56, 57 and the combination of light 58, aperture 59 and photo cell 61.

As has been stated above selective conversion of the indium layer to the oxide form may be effected by simply taking the tape as it is wound on takeup reel 31, placing the reel and tape in an oven and conducting the heating operation (generally conducted at a temperature of about 100° C.) for a period of about 3 or 4 hours. Because of the discovery of the phenomenon that the requisite oxygen for effecting the conversion to indium oxide is trapped in the layer of indium metal as it is deposited, there is no need to upwind the coated tape from the reel to insure contact of the surface of the indium layer with the oxygen-containing environment. Of course, in the event the substrate is not flexible, coated parts may be stacked, nested or separated as desired to effect the heating step and consequent conversion to the oxide form.

The optical transmission and the resistance of these deposited films of indium is determined (although in accordance with different relationships) both by the thickness of the deposit and by the pressure of the oxygen in the chamber at the time of the deposition of the indium film. Thus, with two parameters to control, film thickness and oxygen pressure, a very wide latitude is available for the selection of electrical resistance and degree of transparency. By employing a particular value of each of the aforementioned parameters, a thin indium-oxide indium film having any one of a variety of combinations of optical transparency and electrical resistance can be selectively obtained.

The curves 71 and 72 in FIG. 4 define the minimum operating conditions for the practice of the several aspects of this invention. Thus, curve 71 is a plot of the equation, $Y=1.8\times10^{-3}X$ and curve 72 is a plot of the equation $Y=4.7\times10^{-3}X$, where Y is the oxygen pressure in microns of mercury and X is the indium deposition rate in angstroms per minute. Curve 71 defines the approximate minimum oxygen pressure (plotted as a function of the indium deposition rate), which is needed to produce films substantially of indium oxide over about 60 angstroms in thickness and having an optical transparency of at least 95% by conversion of the indium with heat. Curve 72 defines the approximate minimum oxygen pressure (plotted as a function of the indium deposition rate), which is required to produce films substantially of indium oxide having a thickness greater than 60 angstroms and having an optical transparency of at least 90% without treatment subsequent to the indium deposition.

If a film of indium is deposited on the substrate so as to have a thickness in the range of between about 25 and 60 angstroms in the presence of oxygen such that the oxygen pressure has a value relative to the given rate of indium deposition at least as great as is prescribed by curve 71, conversion of the indium layer to the oxide form will occur simply by exposing such a coating to the atmosphere without the necessity of applying heat. After the conversion to the oxide form has occurred, the resistance of such films is relatively high, generally being greater than 100,000 ohms per square. The optical transparency of such films is at least as high as 90%.

*Example 1*

| | |
|---|---|
| Substrate | Cronar[1] tape. |
| Oxygen pressure | 28 microns of mercury. |
| Tape speed | 0.067 foot per second. |
| Exposure time | 0.374 second. |
| Total indium deposited | 4 micrograms/cm.$^2$ in a coating about 50° A. thick. |
| Indium deposition rate | 8700° A. per minute. |
| Initial optical transparency (OT) | 85%. |
| Initial electrical resistance (R) | Greater than $10^7$ ohms/square. |
| OT after exposure to room air | 98%. |
| R after exposure to room air | Greater than $10^7$ ohms/square. |

[1] Polyethylene terephthalate tape described in U.S. Patent 2,641,592—Hofrichter; marketed by E. I. du Pont de Nemours and Co. of Wilmington, Del., under the name "Cronar."

In those instances in which the film of indium deposited is greater than about 60 angstroms, whether or not subsequent heating of the coating is required for conversion to the oxide depends upon the magnitude of the oxygen pressure, which was employed during the deposition of the indium. If the oxygen pressure corresponding to a given rate of deposition is equal to or greater than the value prescribed by curve 72, films having an optical transparency at least as high as 90% are obtained without heating or exposure to air or other oxygen-containing environment. The electrical resistance of such films is of the order of 1000 to 5000 ohms per square.

Still another alternative in the practice of this invention is that in which the film of indium is greater than about 60 angstroms in thickness and the oxygen pressure employed corresponding to a given rate of deposition has a value at least as great as the value prescribed by curve 71, but less than the value prescribed by curve 72. Such films do require a heating step to convert the indium metal to the oxide form. As stated above, this heating step may be conducted in the absence of or in the presence of oxygen, as desired, and is usually executed at a temperature of about 100° C. for a period of about 3 to 4 hours. After this treatment has been completed, the optical transparency of the coating is equal to or greater than 95% and the resistance may be reduced to about 1000 ohms per square.

Once the heating step has begun, the optical transparency increases and the electrical resistance decreases as the heating progresses. Therefore, by stopping the conversion heating of any given film after a selected period of time, a predetermined value of any of a variety of combinations of optical transparency and resistance may be produced as is shown in the following examples. In all examples shown herein the tabulated light transmittances and electrical resistances are the light transmittances and electrical resistances of the coatings.

*Example 2*

| | |
|---|---|
| Substrate | Cronar tape. |
| Oxygen pressure | 28 microns of mercury. |
| Tape speed | 0.46 foot per second. |
| Exposure time | 0.543 second. |
| Total indium deposited | 6 micrograms/cm.$^2$ in a coating greater than 60 A. thick. |
| Indium deposition rate | 9000 A. per minute. |
| Initial OT as deposited | 71%. |
| Initial R as deposited | 250,000 ohms/square. |
| After exposure to room air OT | 92%. |
| After exposure to room air R | 250,000 ohms/square. |

Samples (*a*), (*b*) and (*c*) as affected by heating:

| Optical transparency, (percent): | Electrical resistance (ohms/square) |
|---|---|
| (*a*) | |
| 6 hrs. at 75° C.=99% | 24,000 |
| 24 hrs. at 75° C.=100% | 18,000 |
| (*b*) | |
| 1 hr. at 100° C.=98% | 24,000 |
| 2 hrs. at 100° C.=99% | 16,000 |
| 5 hrs. at 100° C.=99.5% | 15,000 |
| (*c*) | |
| 2 hrs. at 125° C.=100% | 16,000 |
| 4 hrs. at 125° C.=100% | 13,000 |

*Example 3*

| | |
|---|---|
| Substrate | Cronar tape. |
| Oxygen pressure | 25 microns of mercury. |
| Tape speed | 0.46 foot per second. |
| Exposure time | 0.543 second. |
| Total indium deposited | 6 micrograms/cm.$^2$ in a coating greater than 60 A. thick. |
| Indium deposition rate | 9100 A. per minute. |
| Initial OT as deposited | 60%. |
| Initial R as deposited | 50,000 ohms/square. |
| After 4 hrs. at 100° C. in oven in presence of air: | |
| OT | 95%. |
| R | 7000 ohms/square. |

The problems arising by the use of too little oxygen during the indium deposition are illustrated in the following example:

*Example 4*

| | |
|---|---|
| Substrate | Cronar tape. |
| Oxygen pressure | 8 microns of mercury. |
| Tape speed | 0.46 foot per second. |
| Exposure time | 0.543 second. |
| Total indium deposited | 13 micrograms/cm.$^2$. |
| Indium deposition rate | 19,800 A. per minute. |
| Initial OT as deposited | 28%. |
| Initial R as deposited | 6300 ohms/square. |

Samples (*a*), (*b*) and (*c*) as affected by heating:

| Optical transparency (percent) | Electrical resistance (ohms/square) |
|---|---|
| (*a*) | |
| 6 hrs. at 75° C.=64% | 3600 |
| 24 hrs. at 75° C. =74% | 3100 |
| (*b*) | |
| 1 hr. at 100° C.=61.8% | 3100 |
| 2 hrs. at 100° C.=66.8% | 3000 |
| 5 hrs. at 100° C.=76% | 2500 |
| 8 hrs. at 100° C.=80% | 2500 |
| (*c*) | |
| 2 hrs. at 125° C.=85% | 2000 |
| 4 hrs. at 125° C.=88.5% | 2000 |

When oxygen is absent from the environment of the indium deposition, conversion to the oxide form does not appear to occur.

*Example 5*

| | |
|---|---|
| Substrate | Cronar tape. |
| Oxygen pressure | None injected; 0 microns. |
| Tape speed | 0.46 foot per second. |
| Exposure time | 0.543 second. |
| Total indium deposited | 31.5 micrograms/cm.$^2$. |
| Indium deposition rate | 48,000 A. per minute. |
| Initial OT of deposit after exposure to air | 12%. |

*Example 5*—Continued

| | |
|---|---|
| Initial R of deposit after exposure to air | $20\times10^6$ ohms/square. |
| After heating for 4 hrs. at 125° C.: | |
| OT | 12%. |
| R | $20\times10^6$ ohms/square. |

The invention described herein provides a practical process for producing indium oxide films in a low temperature process employing high rates of deposition rendering the process commercially attractive. The indium oxide layer is of high quality and may be selectively produced in a variety of combinations of degree of transparency and value of resistance.

Various modifications are contemplated and may obviously be resorted by those skilled in the art without departing from the spirit and scope of the invention as hereinafter defined by the appended claims.

What we claim as new and desire to secure by Letters Patent of the United States is:

1. A method for preparing on a flexible substrate a thin coating, substantially of an indium oxide, said coating having a resistance as low as about 1000 ohms per square and an optical transmittance in excess of 90% comprising the steps of:

(a) depositing a coating of indium on a flexible substrate at a predetermined rate in an environment containing oxygen gas with the pressure of the oxygen being at least as great as the pressure calculable from the formula:

$$Y=1.8\times10^{-3}X$$

wherein Y is the oxygen pressure in microns of mercury and X is the indium deposition rate in angstroms per minute, (b) coiling the newly coated flexible substrate, and (c) heating the coiled substrate to controllably convert indium in the coating to indium oxide.

2. The method as recited in claim 1 wherein the substrate is plastic material.

3. The method as recited in claim 1 wherein the heating step is conducted in the absence of oxygen.

4. A method for preparing on a substrate a thin coating of indium metal comprising the step of depositing a coating of indium on a substrate at a rate in excess of about 1000 angstroms per minute in an environment containing oxygen at a pressure in the range of from about 2 to about 300 microns of mercury.

5. A method for preparing on a substrate a thin coating by converting indium to indium oxide, comprising the steps of depositing a layer of indium metal on a substrate at a rate in excess of about 1000 angstroms per minute in an environment containing oxygen at a pressure in the range of from about 2 to about 300 microns of mercury, and heating the coated substrate to convert the indium to indium oxide to the desired degree.

6. The method of preparing a coating recited in claim 5 in which the heating step is conducted in the presence of oxygen at a temperature of about 100° C. for a period of between about 3 and 4 hours.

7. The method of preparing a coating recited in claim 5 in which the heating step is conducted in the absence of oxygen at a temperature of about 100° C. for a period of between about 3 and 4 hours.

8. A method for preparing on a substrate a thin coating by converting indium to indium oxide, comprising the step of depositing a layer of indium metal on a substrate at a rate in excess of about 1000 angstroms in an environment containing oxygen with the pressure of the oxygen being at least as great as the pressure calculable from the formula:

$$Y=1.8\times10^{-3}X$$

wherein Y is the oxygen pressure in microns of mercury and X is the indium deposition rate in angstroms per minute.

9. The method of preparing a coating recited in claim 8 wherein the thickness of the coating is in the range of 20 to 60 angstroms and the coated substrate later exposed to an oxygen-containing environment.

10. A method for preparing on a substrate a thin coating of indium-metal indium oxide comprising the step of depositing a coating of indium on a substrate at a predetermined rate in an environment containing oxygen, (1) said oxygen having a pressure corresponding to said predetermined rate lying in the region between curves 71 and 72 in FIG. 4.

11. A method for preparing on a substrate a thin coating of indium-metal indium oxide comprising the step of depositing a coating of indium on a substrate at a predetermined rate in an environment containing oxygen, (1) said oxygen having a pressure corresponding to said predetermined rate at least equal to the value prescribed by curve 72 in FIG. 4.

References Cited

UNITED STATES PATENTS 2,932,590 4/1960 Barrett et al. ________ 117—201

OTHER REFERENCES

"Transparent Electrically Conductive Coating," Olsen and Lougher.

Electrical Manufacturing (March 1958, page 143 et seq.)

"Untersuchungen der elektrischen und lichtelektrischen Leifähigkeit dünner Indiumoxydschichten," G. Rupprecht Zeitschrift für Physik, 139, 504 (1954).

WILLIAM L. JARVIS, *Primary Examiner.*